United States Patent [19]

Harrington

[11] Patent Number: 5,294,947
[45] Date of Patent: Mar. 15, 1994

[54] BODY MOUNTED CAMERA SUPPORT

[76] Inventor: Paul B. Harrington, 52 Rural La., Levittown, N.Y. 11756

[21] Appl. No.: 814,620

[22] Filed: Dec. 30, 1991

[51] Int. Cl.⁵ ............................................. G03B 29/00
[52] U.S. Cl. ....................................... 354/82; 224/908
[58] Field of Search ......................... 354/81, 82, 293; 352/243; 224/908

[56] References Cited

U.S. PATENT DOCUMENTS

| | | | |
|---|---|---|---|
| 3,767,095 | 10/1973 | Jones | 224/908 X |
| 4,895,286 | 1/1990 | DeRosa | 354/82 X |
| 5,073,788 | 12/1991 | Lingwall | 354/81 |

*Primary Examiner*—Michael L. Gellner
*Assistant Examiner*—Howard B. Blankenship

[57] ABSTRACT

A body mounted camera support for use with cameras of different sizes and types. This support provides a hands-free, secure support for the camera either in the horizontal or vertical position. The support includes a shoulder yoke for balance and support. Attached to the yoke, in front of the shoulder, by means of a securing device, is the hinged camera support arm. The arm has a telescoping vertical support which moves vertically and secures to the waist belt. The arm also uses a hinged, interlocking device to allow itself to sit securely either in the horizontal position while in use, or in the vertical position while at rest. The camera is connected to the support arm by means of the camera linking device, whose topside screws into the screw hole in the camera, and whose bottom side is secured into slots on the support arm. Attached around the yoke are two straps which go down the back of the user. The straps attach to a belt which goes around the user's waist. Attached to the waist belt are two pockets for the purpose of carrying accessories.

1 Claim, 4 Drawing Sheets

BODY MOUNTED CAMERA SUPPORT

BACKGROUND

1. The filed of invention for the described invention relates to portable cameras and their accessories being supported and transported by the human body.

2. Video and film photography is a very important part of people's lives today, especially on vacation. With more and more people vacationing with small children, the ability to carry all the accessories, keep the children close by, and eat during the hectic vacation had become difficult. The use of a tripod or monopod is impractical since it adds to the things to be carried around.

This invention enables the user, any user of any age, to carry all the necessary accessories and support the camera hands-free in the two critical positions; horizontally, or in position to use the camera and vertically, or in position to store it securely when not in use. Since both are hands-free, the user can now use the camera or carry the camera while eating or keeping the kids close-by.

This carrier will also simplify the needs of those people who do videotaping such as weddings, news gathering, etc. by allowing the user to be completely mobile while carrying all the necessary pieces to do the job. This body mounted camera support is also terrific for 35 mm film camera use since it allows hands-free movement for the photographer and the ability to carry extra lenses, film, etc. without having to rely on pockets in clothing.

Several camera supports have been developed:
U.S. Pat. No. 4,895,286 to De Rosa;
U.S. Pat. No. 4,437,753 to Dunn;
U.S. Pat. No. 4,943,820 to Larock;
U.S. Pat. No. 4,545,660 to Rudolph;
U.S. Pat. No. 4,526,308 to Dovey;
U.S. Pat. No. 4,244,500 to Fournier;
U.S. Pat. No. 3,767,095 to Jones;
U.S. Pat. No. 5,073,788 to Lingwall;
While all of the previous supports use some part of the body, they are all disadvantaged because:
None of them use the body as the main support
None of them allow for shoulder adjustments
None of them allow for the anatomical differences between men, women, and children
None of them have hip pockets to carry the necessary accessories
None of them have a hinged camera support that secures the camera next to the body and out of the way.
These are the reasons that give this invention the definite advantage over all the others.

DETAILED DESCRIPTION OF THE PREFERRED EMBODIMENT

Figure 1:
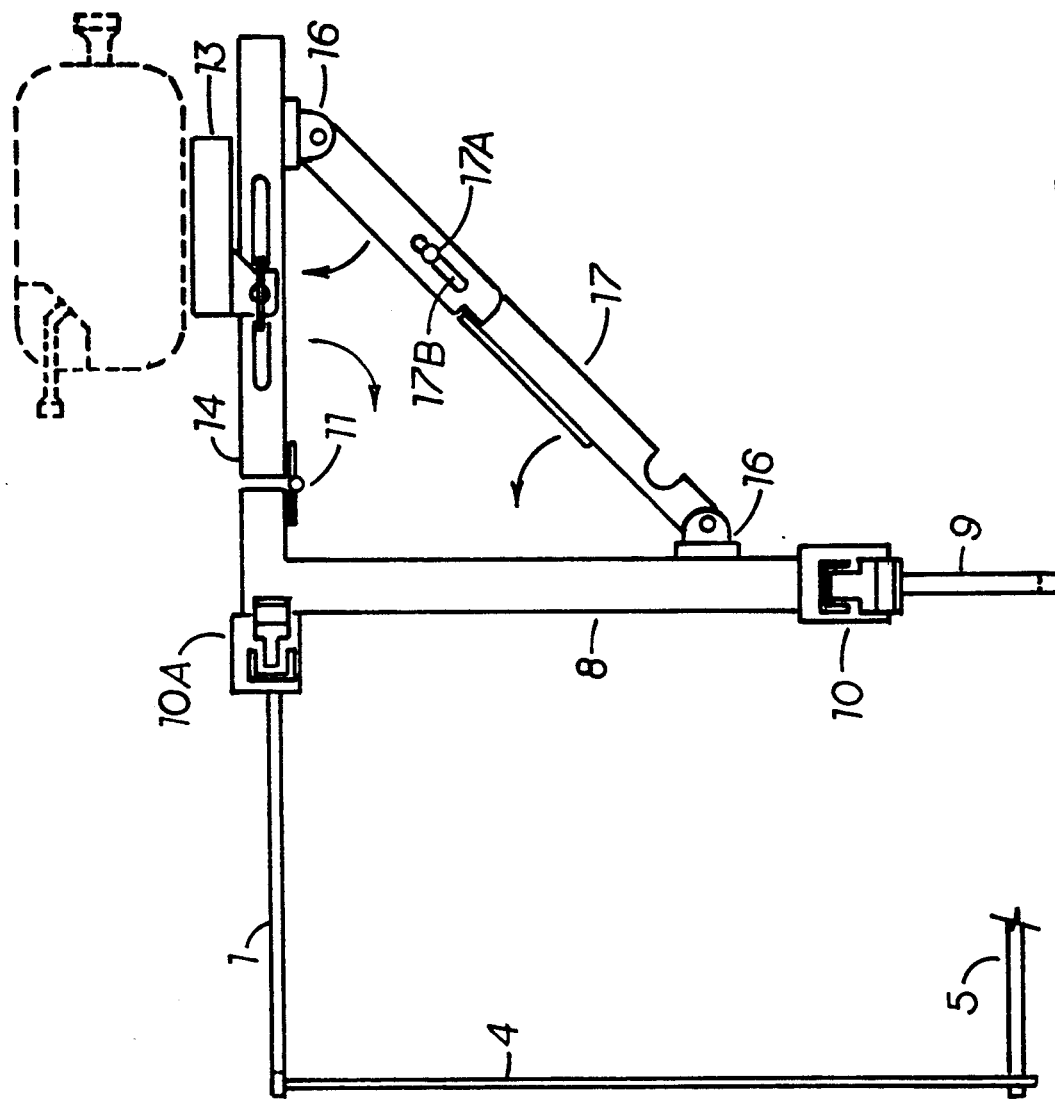
FIG. 1—The camera support side view, fully extended or in the horizontal position
FIG. 2—The camera support side view, collapsed, or in the vertical position
FIG. 3—Front view of the support strap arrangement and the camera support arm, collapsed, or in the vertical position
FIG. 4—Back view of the support strap arrangement and the camera support arm, collapsed, or in the vertical position
FIG. 5—Front view of the linking device
FIG. 6—Top view of the linking device
Figure 2:
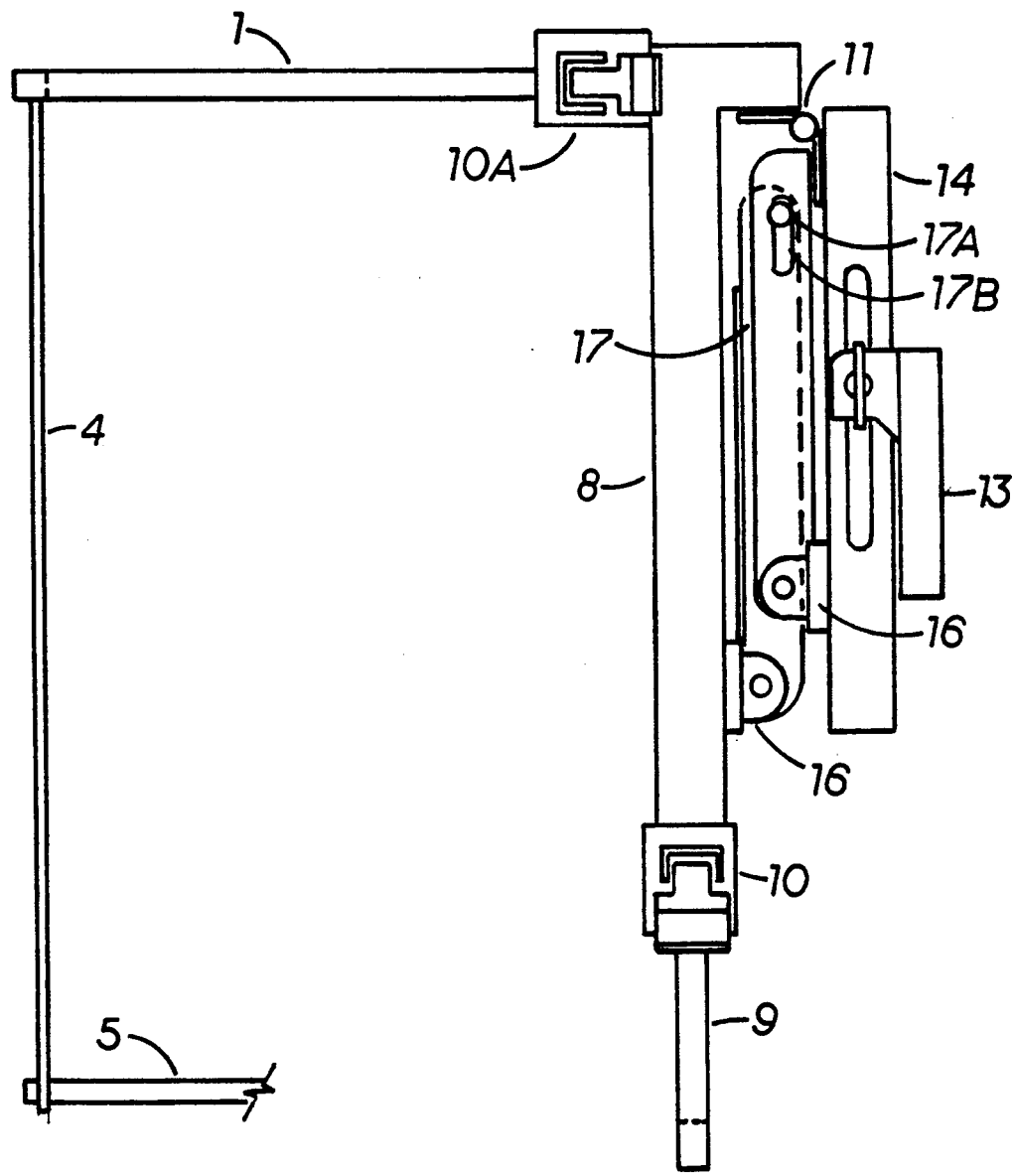
Figure 4:
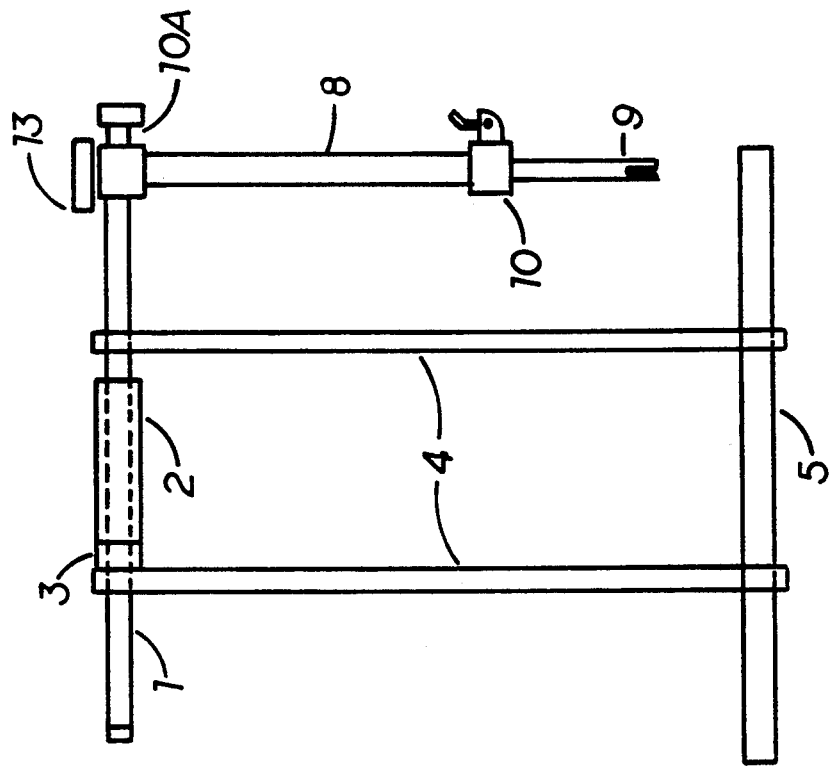
Figure 3:
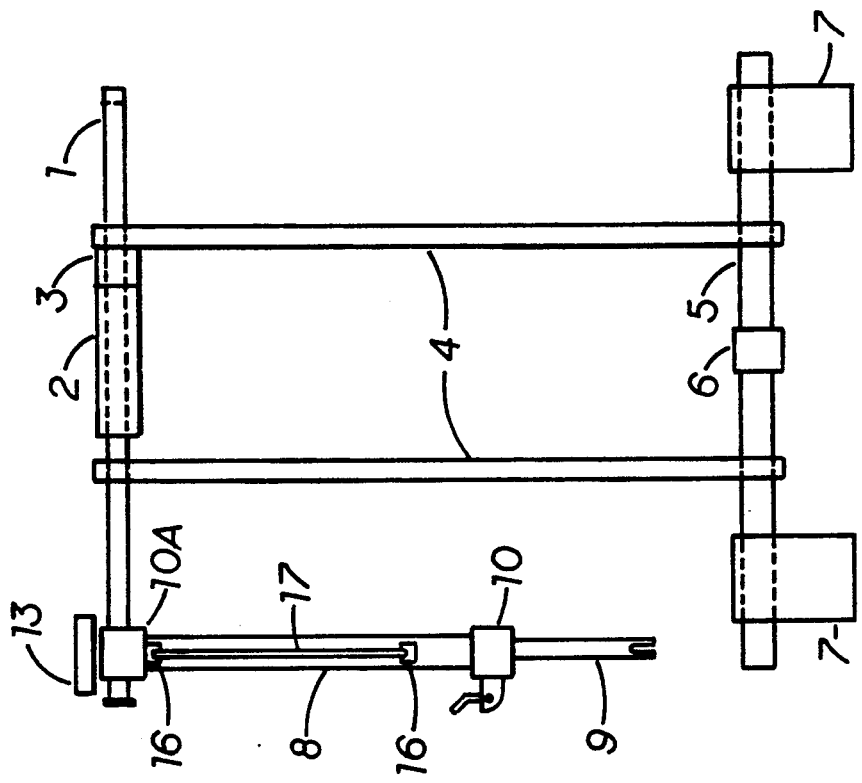
Figure 5:
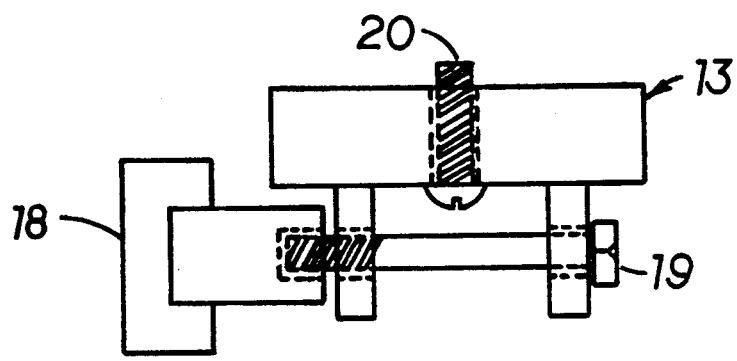
Figure 6:
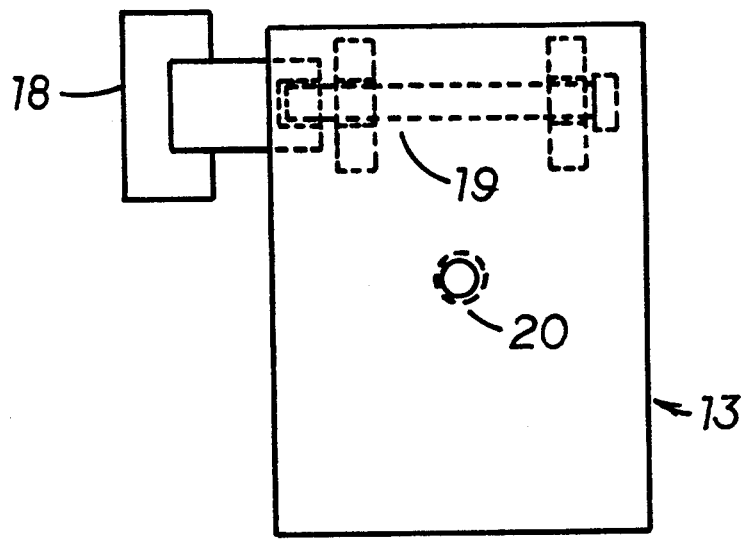

The body-mounted camera support (the invention described herein) is a portable camera and accessories carrier for film, video and photography. The support is broken down into two sections: FIG. 3 shows the front view and FIG. 4 the back of the first section consisting an adjustable shoulder yoke (1), two back straps (4), one hip strap (5) and two accessories pockets (7). The shoulder yoke (1) is made of two square or rectangular aluminum or heavy plastic pieces with one sliding inside the other. This is designed to be adjustable in length. Once adjusted to the user's preference, they are locked in place by a channel lock (3). The outer piece of the yolk starts from in front of the shoulder, has a 90 degree turn around the shoulder, and extends along the shoulder past the neck. The inner piece extends to the end of the shoulder, opposite to the 90 degree turn, where the end is looped into a circle. In the center of the outer piece is the neck pad (2). This is made of foam rubber or any comfortable material used to make the neck comfortable against the yoke. Next are the two adjustable back straps (4). These straps are made out of any cloth fiber. One strap is sewn around the outer piece of the yoke and one is sewn around the inner piece. The straps extend vertically down the back and are secured around the hip strap (5). These straps are adjustable to conform to the torso of the user. The adjustable hip strap (5) is also made of any cloth fiber. It wraps around the hips or waist and is secured in the front by a buckle (6). This unit will balance the weight of the camera and keep it secure to the body of the user. On the hip strap (5) are the two accessories pockets (7). They are loosely secured to the hip strap (5) so the user can put them anywhere for personal comfort. These pockets can be made out of any fiber. FIG. 1 shows the second section which consists of a vertical weight support (8) and a hinged camera support arm (14). The vertical weight support (8) is two pieces of aluminum or heavy plastic designed so one piece slides within the other to allow for personal adjustments. Once adjusted, the pieces are locked by a channel lock (10). The vertical weight support sits vertically alongside the body from shoulder to waist. The inner piece of the vertical weight support (9) extends down to the hip strap (5). It has an inverted "V" cut in its end so as to fit snugly over the hip strap (5). The outer piece of the vertical weight support is shaped like a "T". The stem of the "T" locks onto the inner part by a channel lock (10). The left arm of the "T" slides over the shoulder yoke extension along the shoulder and is secured by a channel lock (10A). This secures the vertical weight support (8) to the shoulder yoke (1). The right rm of the "T" is a hinge (11) which connects the vertical weight support (8) to the camera support arm (14). The hinge (11) allows the camera support arm (14) to be moved and used in either the vertical or horizontal position. The camera support arm (14) is a square or rectangular piece of aluminum or heavy plastic. It is designed so when the arm is horizontal, it extends from the hinge (11) away from the body. Within the arm is a horizontal slot cut out of both sides of the arm. This slot allows the camera linking device (13), shown in FIGS. 5&6, to be moved to and away from the user for personal preference. The camera linking device screws (20) into the camera's screw hole. The mount's two securing brackets are found on the bottom left and bottom right of the mount and are aligned to the horizontal slot in the support arm (14). Through the brackets and the slots goes the bolt (19). By using a wing nut (18), the user can loosen and tighten the mount and adjust the camera to different positions. The second piece of the camera support is the interlocking device (17) in FIG. 1. This consists of two parts. The first part is the anchors (16). The anchors are where the interlocking device attach to. These are made of the same material as the camera support arm (14) and the vertical weight support (8). One anchor (16) is mounted on the underside of the camera support arm (14) and the other is mounted on the side farthest away from the suer of the vertical weight support (8). The second part is the interlocking device (17). This is two identical pieces of either aluminum or heavy plastic. Each piece has a 90 degree lip on the top with a ¼ inch piece cut out on the outside end of each lip. One of the pieces is reversed so the lip cut outs face each other. The two pieces are loosely secured with a rivet (17A) and slide freely within the slot (17B). Each piece is also loosely secured to the anchors. FIG. 1 shows that when the camera support arm (14) is horizontal, the hinge (11) is at 90 degrees to the vertical weight support (8). The two cut outs in the lips interconnect with each other and the interlock is created. This creates the support for the unit in the horizontal position, allowing the user to use the camera in a hands-free manner. In FIG. 2, you see that when the interlock is broken, or released, the hinge (11) folds down to zero degrees to the vertical weight support (8) and the camera support arm (14) and camera sit securely against the outside edge of the vertical weight support (8). This allows the user to transport the camera and accessories hands-free.

I claim:
1. A camera support comprising:
a telescopic shoulder yoke, a neck pad attached to said yolk, adjustable back support straps, with each strap having one end attached to said yoke and another end attached to an adjustable waist belt, said belt having ends terminated with a buckle, and two pockets for carrying accessories loosely attached to said waist belt;
a vertical weight support attached to said yoke and resting on said waist belt by an inverted "v" cut into an inside piece of said vertical weight support;
a camera support arm attached to said vertical weight support by a hinge, said arm having a slot for securing a camera rest, said camera rest attached to said slot in said arm, said rest having a screw adapted to match a screw hole in a camera base;
said camera support arm also being attached to interlocking means comprising portions having a collapsed and an extended position, said portions loosely secured together by a rivet which is slidable in a slot in one of said portions, said portions rotatably secured to said vertical weight support and to said support arm;
when said portions are in the extended position said arm is at a right angle to said weight support, and when said portions are in the collapsed position said arm is parallel to said weight support;
said camera support adapted to support a camera hands-free when said portions are in the extended position and when said portions are in the collapsed position.

* * * * *